United States Patent
Lin

(10) Patent No.: US 6,724,505 B2
(45) Date of Patent: Apr. 20, 2004

(54) IMAGE SCANNING METHOD FOR INCREASING RESOLUTION OF A DOCUMENT IMAGE

(75) Inventor: Chin-Yuan Lin, Tai-Chung (TW)

(73) Assignee: Avision Inc., Hsin-Chu Hsien (TW)

( * ) Notice: Subject to any disclaimer, the term of this patent is extended or adjusted under 35 U.S.C. 154(b) by 314 days.

(21) Appl. No.: 09/682,553

(22) Filed: Sep. 19, 2001

(65) Prior Publication Data

US 2002/0159102 A1 Oct. 31, 2002

(30) Foreign Application Priority Data

Apr. 26, 2001 (TW) ........................... 90110041 A

(51) Int. Cl.$^7$ .............................. H04N 1/04
(52) U.S. Cl. ................ 358/497; 358/486; 358/483; 358/474
(58) Field of Search ................. 358/497, 471, 358/474, 494, 486, 488, 496, 498, 505, 506, 487, 412, 409; 318/696, 685; 250/208.1, 234–236, 208.3

(56) References Cited

U.S. PATENT DOCUMENTS

| | | | | |
|---|---|---|---|---|
| 4,575,769 A | * | 3/1986 | Arnoldi ............ | 358/498 |
| 5,359,271 A | * | 10/1994 | Husher ............ | 318/696 |
| 5,373,372 A | * | 12/1994 | Loewen ........... | 358/486 |
| 5,945,800 A | * | 8/1999 | Chen .............. | 318/696 |
| 6,101,006 A | * | 8/2000 | Bryant et al. ...... | 358/506 |
| 6,147,780 A | * | 11/2000 | Chiang ............ | 358/497 |
| 6,278,513 B1 | * | 8/2001 | Murata et al. ...... | 250/208.3 |
| 6,414,461 B1 | * | 7/2002 | Chang ............. | 318/696 |
| 6,531,690 B2 | * | 3/2003 | Kozuka ........... | 250/208.1 |
| 6,603,581 B2 | * | 8/2003 | Lam et al. ........ | 358/474 |

* cited by examiner

Primary Examiner—Cheukfan Lee
(74) Attorney, Agent, or Firm—Winston Hsu

(57) ABSTRACT

An image scanning method used in a scanner. The scanner includes a housing, a transparent platform set on the housing for a document to be placed on, a scanning module installed inside the housing for scanning the document, and a step motor for driving the scanning module step by step so as to scan the document. After completing a first scanning pass, the scanning module moves a predetermined distance, which corresponds to non-integer steps of the step motor so that when the scanning module performs a second scanning pass, sampling positions of the second scanning pass are different from sampling positions of the first scanning pass.

6 Claims, 6 Drawing Sheets

IMAGE SCANNING METHOD FOR INCREASING RESOLUTION OF A DOCUMENT IMAGE

BACKGROUND OF INVENTION

1. Field of the Invention

The present invention relates to an image scanning method used in a scanner. More specifically, the present invention discloses an image scanning method for increasing a resolution of a document image used in a scanner.

2. Description of the Prior Art

A scanner is a widespread peripheral device for scanning documents and producing corresponding image data. The scanner has some additional functions, such as faxing image data to a fax machine over telephone lines, transmitting the image data in e-mail format over a network, or connecting to a printer to print the image data.

Please refer to FIG. 1 and FIG. 2. FIG. 1 is a diagram of a scanner 10 according to the prior art. FIG. 2 is a functional block diagram of the scanner 10. The scanner 10 comprises a housing 12, control circuitry 22 for controlling operations of the scanner 10, a scanning module 18 installed inside the housing 12, and a step motor 20 installed inside the housing 12 and electrically connected between the control circuitry 22 and the scanning module 18. As shown in FIG. 1, a transparent platform 14 is set on the housing 12 for a document 16 to be placed on. While the scanning module 18 scans the document 16, the control circuitry 22 controls the step motor 20 to drive the scanning module 18 step by step so as to scan the document 16.

Please refer to FIG. 3, which is a diagram of a movement of the scanning module 18 when utilizing a prior art image scanning method. As shown in FIG. 3, when the document 16 is placed on the transparent platform 14 for performing a scanning pass, the scanning module 18 moves forward continuously along an X direction from a starting end 17 in a fixed space corresponding to one step of the step motor 20, and performs actions of exposure and images reading until the scanning module 18 reaches a stopping end 19 of the scanner 10. Then, the scanning module 18 moves backward to the starting end 17 from the stopping end 19 so as to complete a scanning procedure.

To double the resolution of the scanned image, the prior art scanner utilizes the control circuitry 22 to control the step motor 20 to move a step unit which is half the original step distance of the step motor 20 so as to scan the document 16. In this way, pixel numbers of the scanned image of the document 16 are doubled. When the scanning module 18 completes the scanning procedure to scan the document 16, the resolution of the document 16 image increases twofold.

Nevertheless, from a standpoint of motor control, when the scanner 10 doubles the resolution of the scanned image, the step motor 20 uses half-step control. Under half-step control, a scanning rate of the step motor 20 is slower, in contrast with full-step control, so that it is easy to cause missteps of the scanning module 18, which leads the scanning procedure to produce errors if the scanner 10 uses the half-step control too much. Furthermore, in the backward process, after completing the scanning procedure, the scanning module 18 only does oblique auto-correcting, auto-reducing and bright contrast correction image processing, without taking image samples from the document 16. In today's image processing field, a data-transmitting mode of the scanner 10 is increasingly fast, and a rate of image processing accelerates. Under these conditions, very little time is spent performing image processing during the backward process. It seems a waste of the rest of that time not to take image samples from the document 16.

SUMMARY OF INVENTION

It is therefore a primary objective of this invention to provide an image scanning method for increasing resolution of a document image used in a scanner.

The present invention, briefly summarized, discloses an image scanning method used in a scanner. The scanner includes a housing, a transparent platform set on the housing for a document to be placed on, a scanning module installed inside the housing for scanning the document, and a step motor for driving the scanning module step by step so as to scan the document. After completing a first scanning pass, the scanning module moves a predetermined distance, which corresponds to non-integer steps of the step motor, so that when the scanning module performs a second scanning pass, sampling positions of the second scanning pass are different from sampling positions of the first scanning pass.

It is an advantage of the present invention that the image scanning method still utilizes full-step control of the step motor to perform a scanning procedure. The full-step control of the step motor allows the step motor to maintain a normal step rate so that time of the scanning procedure is reduced, and further avoids problems of motor missteps for increasing resolution of the document when performing the scanning procedure.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
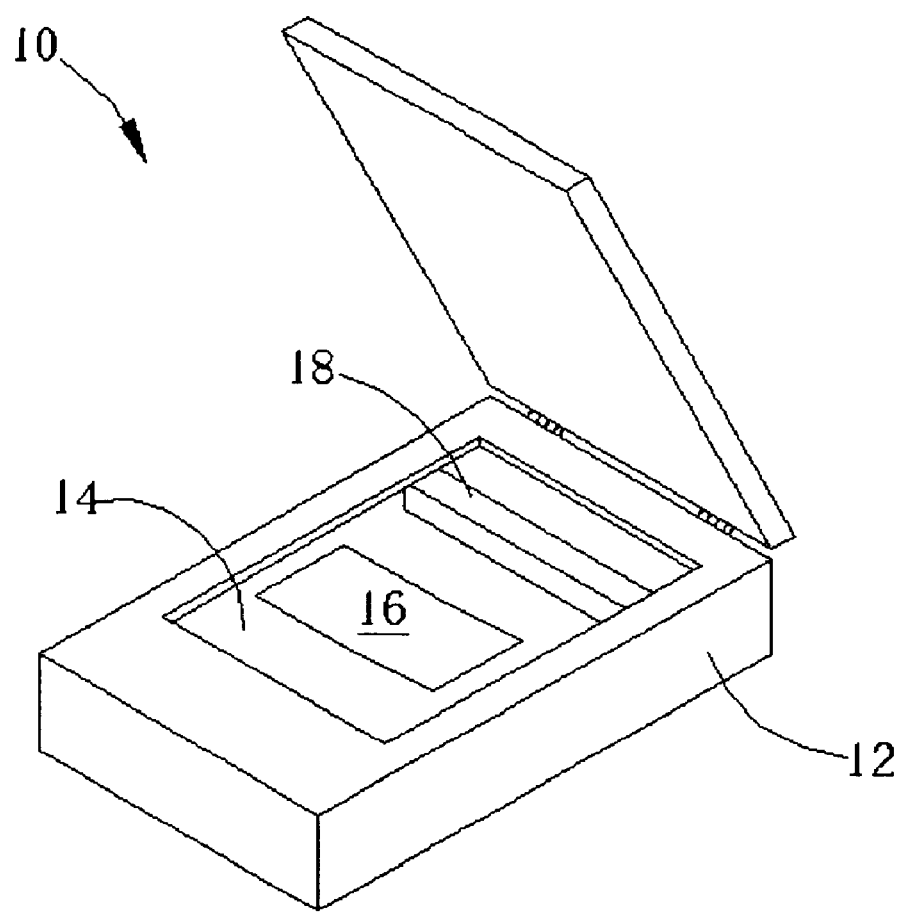
FIG. 1 is a diagram of a scanner according to the prior art.
Figure 2:
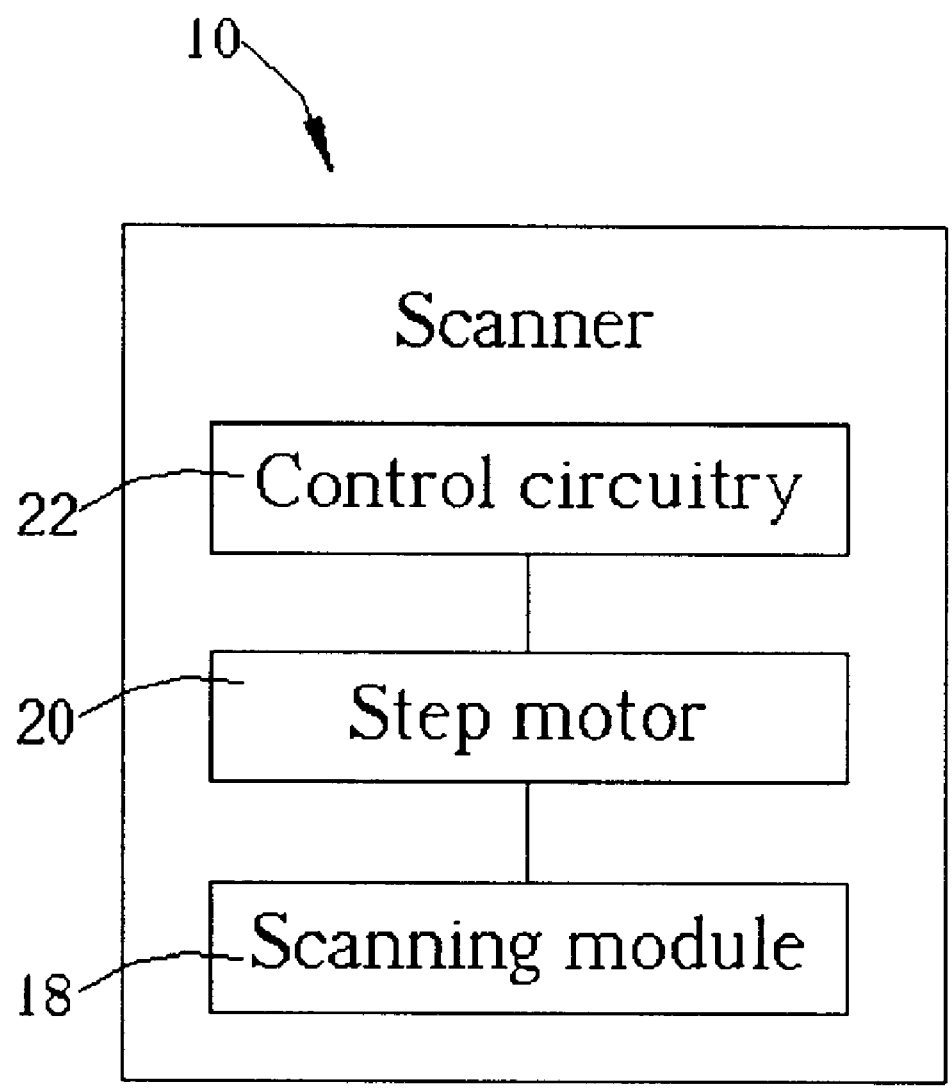
FIG. 2 is a functional block diagram of a scanner according to the prior art.
Figure 3:
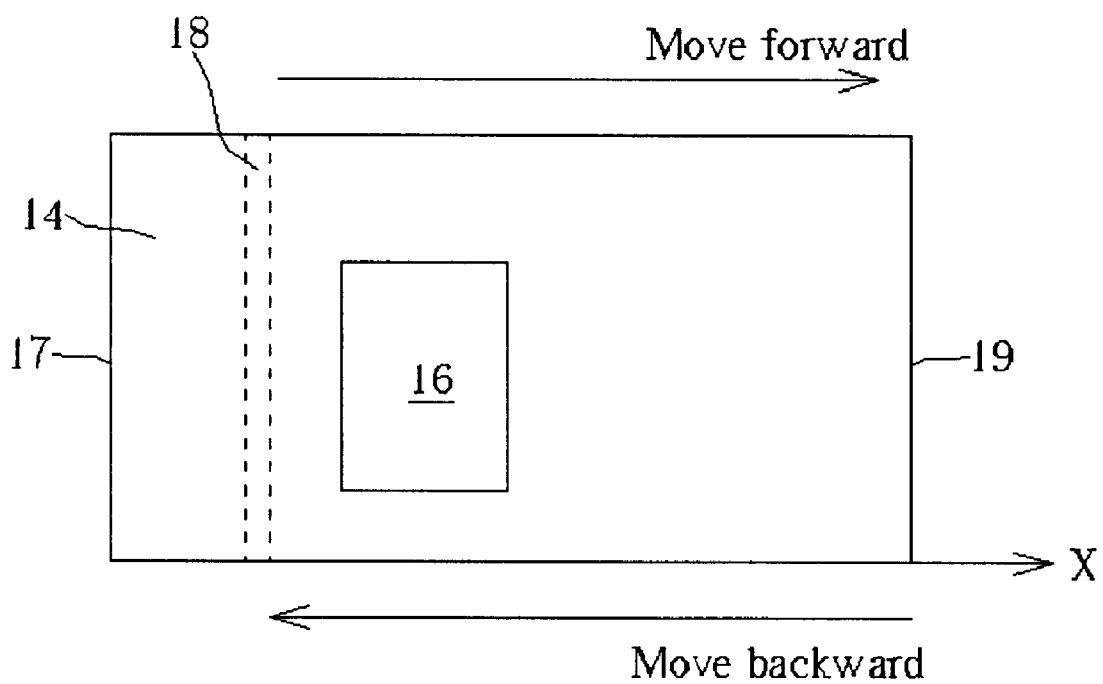
FIG. 3 is a diagram of the scanning module movement when utilizing a prior art image scanning method.
Figure 4:
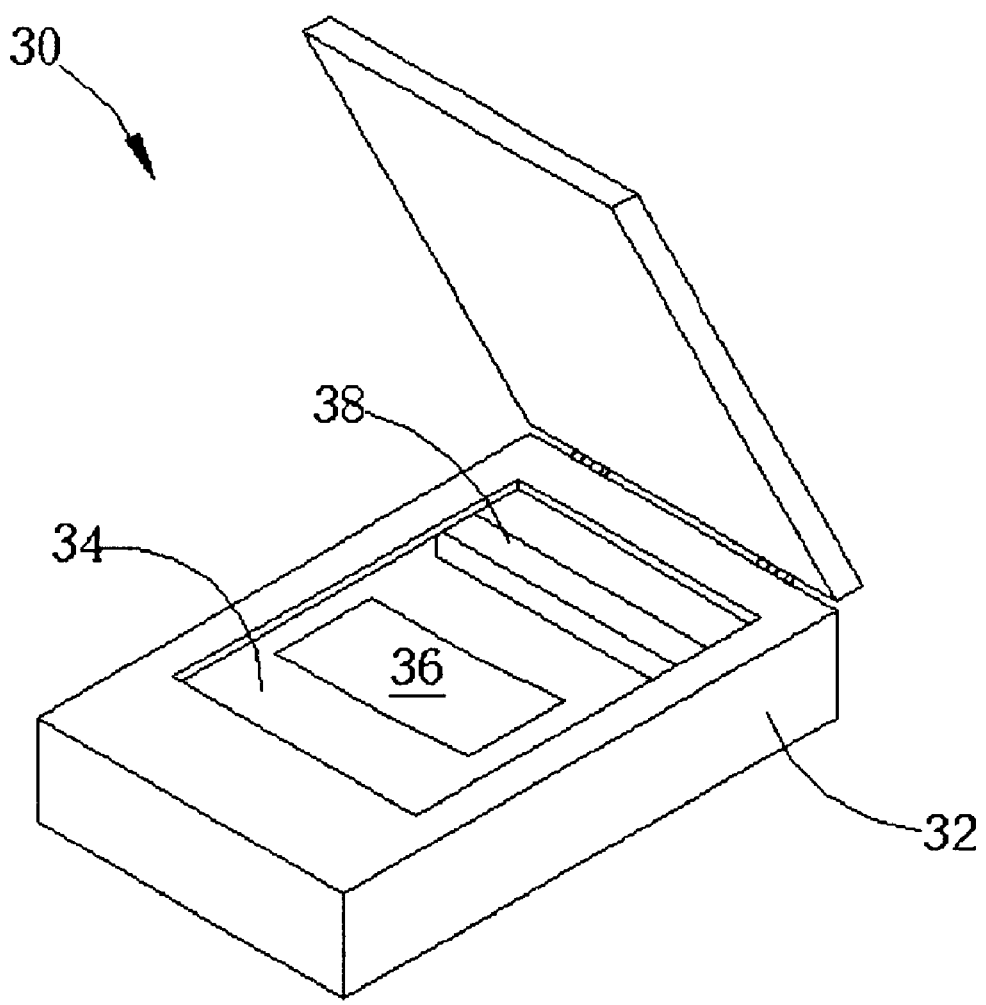
FIG. 4 is a diagram of a scanner according to the present invention.
Figure 5:
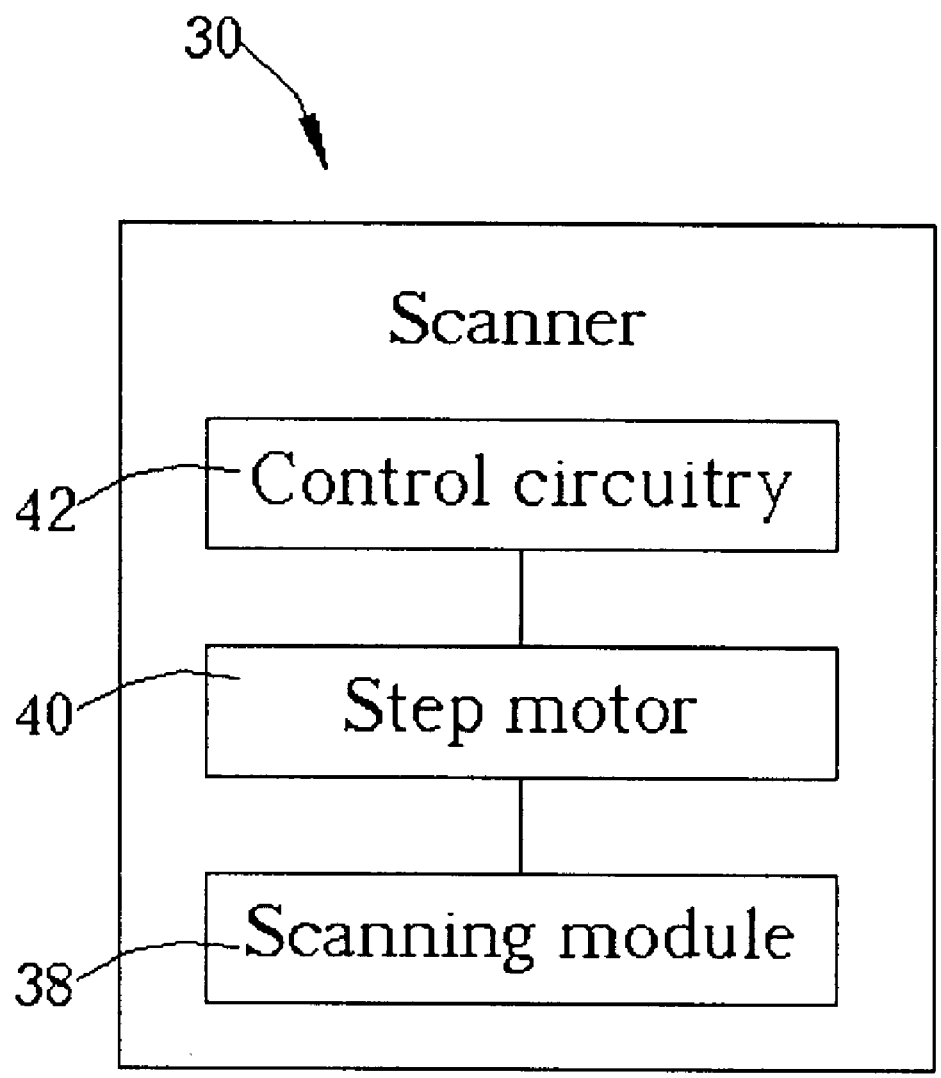
FIG. 5 is a functional block diagram of the scanner according to the present invention.

Please refer to FIG. 4 and FIG. 5. FIG. 4 is a diagram of a scanner 30 according to the present invention. FIG. 5 is a functional block diagram of the scanner 30 according to the present invention. The scanner 30 comprises a housing 32, control circuitry 42 for controlling operations of the scanner 30, a scanning module 38 installed inside the housing 32, and a step motor 40 installed inside the housing 32 and electrically connected between the control circuitry 42 and the scanning module 38. As shown in FIG. 4, a transparent platform 34 is set on the housing 32 for a document 36 to be placed on. While the scanning module 38 scans the document 36, the control circuitry 42 controls the step motor 40 to drive the scanning module 38 step by step so as to scan the document 36.

Figure 6:
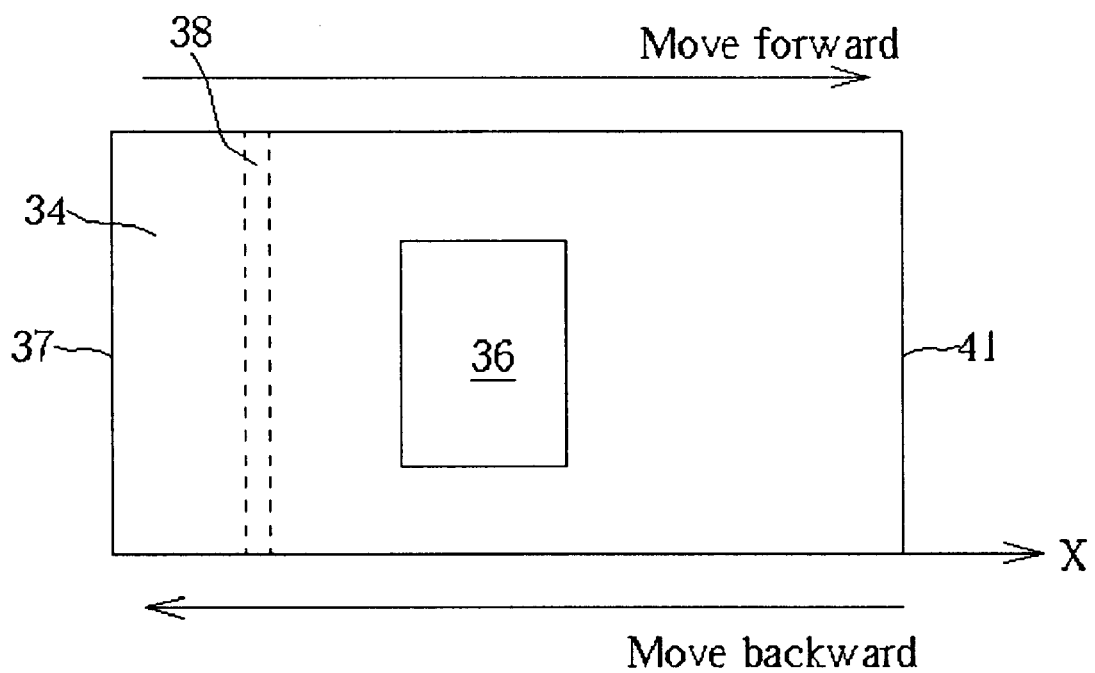
FIG. 6 is a diagram of a scanning module movement when utilizing a present invention image scanning method.

Please refer to FIG. 6 of a diagram of a movement of the scanning module 38 when utilizing a present invention image scanning method. As shown in FIG. 6, the present invention image scanning method is used when the document 36 is placed on the transparent platform 34 for performing a scanning pass. The scanning module 38 moves forward continuously along an X direction from a starting end 37 of the transparent platform 34 in a fixed space corresponding to one step of the step motor 40, and performs actions of exposure and image reading. When the scanning module 38 moves to a stopping end 41 of the transparent platform 34, the scanning module 38 completes a first scanning pass for the document 36. After completing the first scanning pass, the scanning module 38 moves a predetermined space forward (or backward) to the X direction (or opposed to the X direction) which corresponds to non-integer steps of the step motor 40, with the predetermined space being less than a distance corresponding to one step of the step motor. Then, the scanning module 38 performs a second scanning pass, the scanning module 38 will move backward (or opposed to the X direction) to the starting end 37 of the transparent platform 34 and perform actions of exposure and image reading. The scanning module 38 moves the predetermined space forward (or backward) to the X direction (or opposed to the X direction), which corresponds to non-integer steps of the step motor 40 after completing the first scanning pass, so that sampling positions of the second scanning pass are different from sampling positions of the first scanning pass.

As mentioned above, the scanning module 38 installed in the housing 32 takes samples from the document 36 in both forward and backward scanning passes. To double the resolution of the scanned image of the document 36, the present invention utilizes the control circuitry 42 to control the step motor 40 so as to perform a scanning procedure to scan the document 36 using a full-step of the step motor 40 functioning as one step unit. When the scanning module 38 moves from the starting end 37 to the stopping end 41 of the transparent platform 34, the scanning module 38 completes the first scanning pass for the document 36. After completing the first scanning pass, the scanning module 38 moves the predetermined space forward (or backward) to the X direction (or opposed to the X direction), which corresponds to a half step of the step motor 40. Then, the scanning module 38 performs the second scanning pass. The scanning module 38 moves backward from the stopping end 41 to the starting end 37 of the transparent platform 34. Sampling positions of the document 36 between the first scanning pass and the second scanning pass are different, so when the scanning module 38 completes the scanning procedure, pixel numbers of the scanning image of the document 36 are double, and image resolution of the document 36 increases twice.

Furthermore, the present invention disclosure is not limited to the description above, a user can design a multiple of image resolution that the user needs. If the user needs N multiples of the image resolution, the scanning module 38 will perform N scanning passes to scan the document 36, and the predetermined space is a distance corresponding to 1/N steps of the step motor 40.

In contrast to the prior art, the present invention method for increasing resolution of a document image still utilizes full-step control of the step motor to perform a scanning procedure, the full-step control of the step motor allowing the step motor to maintain a normal step rate so that time of the scanning procedure is reduced, and problems of motor missteps are avoided, for increasing resolution of the document when performing the scanning procedure. From a standpoint of motor control, it is easy for the half-step control of the step motor, in contrast to the full-step control of the step motor, to produce missteps. Consequently, a full-step system is more stable.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image scanning method need in a scanner, the scanner comprising:
   a housing;
   a transparent platform set on the housing for a document to be placed on;
   a scanning module installed inside the housing for scanning the document; and
   a driving device for driving the scanning module step by step so as to scan the document;
   the scanning method comprising:
      after completing a first scanning pass, moving the scanning module a predetermined space which corresponds to non-integer steps of the driving device so that when the scanning module performs a second scanning pass, sampling positions of the second scanning pass are different from those of the first scanning pass.

2. The scanning method of claim 1 wherein the predetermined space is less than a distance corresponding to one step of the driving device.

3. The scanning method of claim 1 wherein when the scanning module is to perform N scanning passes, the predetermined space is a distance corresponding to 1/N steps of the driving device.

4. The scanning method of claim 1, wherein the scanning module takes samples from the document in both forward and backward scanning passes.

5. The scanning method of claim 1 wherein the driving device is a step motor.

6. The scanning method of claim 1 wherein the scanner further comprises control circuitry for controlling operations of the scanner.

* * * * *